Feb. 7, 1928.
B. V. OGDEN
1,658,207
SWITCH FOR AUTOMOBILE STOP LIGHTS
Filed Aug. 23, 1923
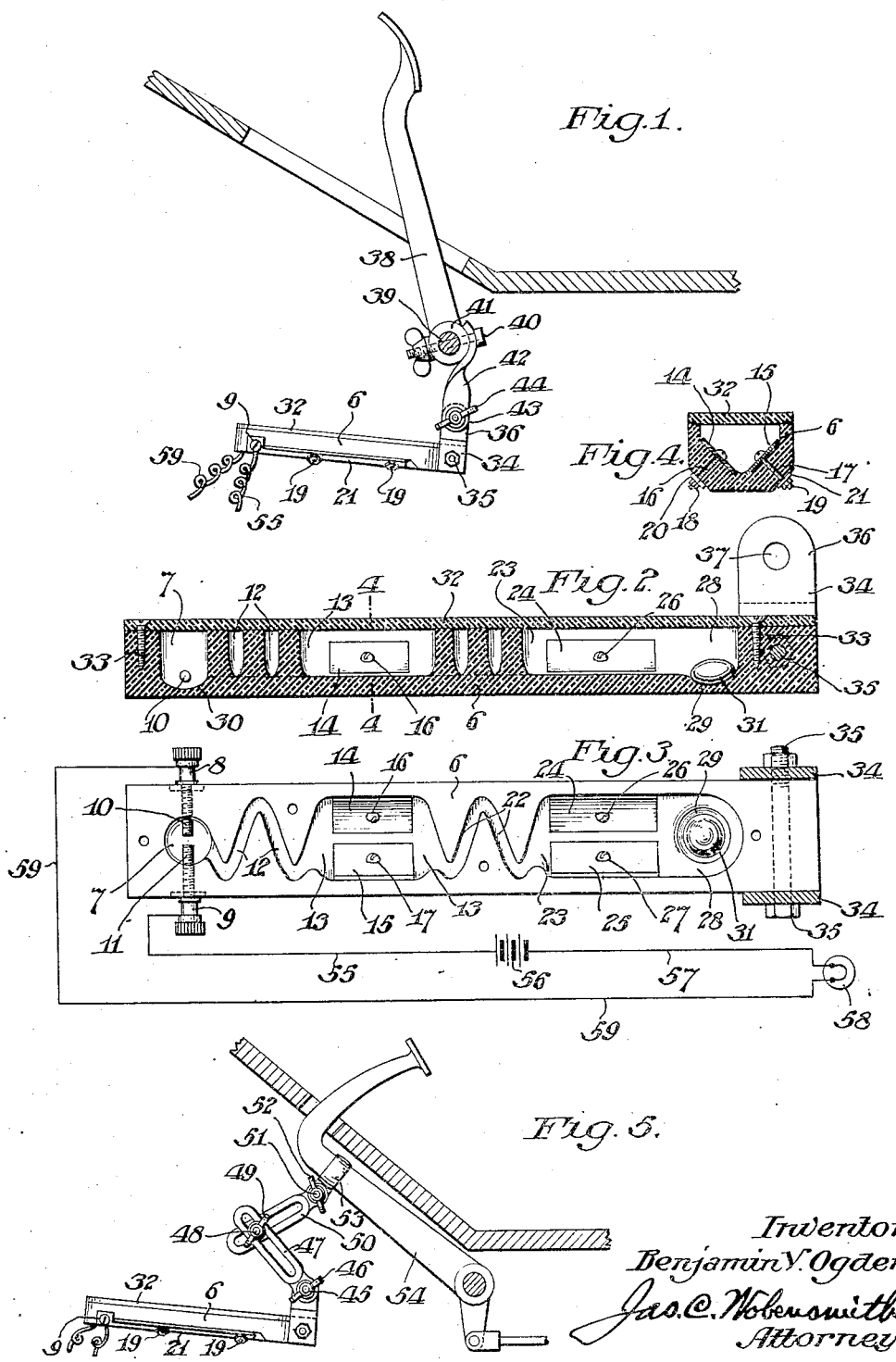
Inventor:
Benjamin V. Ogden,
Jas. C. Wobensmith
Attorney.

Patented Feb. 7, 1928.

1,658,207

UNITED STATES PATENT OFFICE.

BENJAMIN V. OGDEN, OF PHILADELPHIA, PENNSYLVANIA.

SWITCH FOR AUTOMOBILE STOP LIGHTS.

Application filed August 23, 1923. Serial No. 658,854.

My invention relates to a switch for an automobile "stop" light, that is to say, to a device for controlling the electric circuit of that type of signal light upon a motor vehicle which serves to indicate, to the drivers of vehicles, in the rear, that the motor vehicle, upon which the signal light is mounted, is being checked in speed by the application of the brakes thereof.

The principal object of my invention is to provide a simple and efficient switch for electric signal systems of the type above mentioned which may be readily applied to the motor vehicle without requiring material change in the mechanism thereof, which will be inexpensive in its construction and certain in its operation, and which is characterized by the absence of springs, sliding contacts, etc., which are likely to get out of order and impaired in their efficiency, both mechanically and electrically, by reason of the constant operation of same, and a further object of my invention is to provide a switch which will serve to preliminarily make and break the circuit several times prior to the final closing of the circuit when the brakes are applied, whereby the attention of the drivers of other vehicles in the rear will be more positively attracted to the operation of the signal by the preliminary flashing of the light prior to the final closing of the circuit.

With the foregoing objects in view, my invention contemplates the provision of a member made of insulating material having an internal passage-way through which a globule of mercury is adapted to pass from one end to the other as the brake pedal lever is actuated, there being provided in said passage-way a plurality of pairs of contact members arranged at suitable places to establish an electrical connection through the globule of mercury as the same is caused to pass along said passage-way when the brake pedal lever is actuated, said passage-way being preferably so shaped as to prevent a too rapid passage of the mercury therethrough, and my invention also contemplates certain details of construction as will later appear.

The nature and characteristic features of my invention will be more readily understood from the following description taken in connection with the accompanying drawings forming part hereof, in which:—

Figure 1 is an elevational view, partly in section, of a fragmentary portion of a motor vehicle, illustrating the brake pedal lever with a device embodying the main features of my present invention shown in connection therewith;

Fig. 2 is a vertical central longitudinal section, enlarged, illustrating the internal construction of the switch;

Fig. 3 is a horizontal plan thereof, but with the cover plate removed, the attachment bracket being shown in section, and the electrical connections with the battery and signal light being shown diagrammatically.

Fig. 4 is a transverse section taken approximately on the line 4—4 of Fig. 2; and Fig. 5 is a view similar to Fig. 1, but illustrating a brake lever of a different type, and modified means for attaching the switch device of my invention thereto.

Referring now more particularly to Figs. 2, 3, and 4 of the drawings, in the particular embodiment of my invention therein shown, 6 is an elongated block of insulating material, in the forward end of which is a well or chamber 7. Binding posts 8 and 9 are mounted near the end of the block 6, projecting out from the respective side faces thereof, and having studs 10 and 11 respectively extending into the bottom portion of the well or chamber 7, said studs 10 and 11 being so arranged that their innermost ends are disposed in proximity to, but not touching, each other.

Extending from the well or chamber 7 is a sinuous passage-way 12 which extends to an enlarged opening 13 having inclined side walls in which are mounted the respective contact plates 14 and 15, the lower margins of which are in proximity to, but not touching, each other. The contact plates 14 and 15 are held in place by means of the respective screws 16 and 17, the nuts 18 and 19 of which bear against the conductor bars 20 and 21 which respectively extend to, and contact with the binding posts 8 and 9.

Extending from the enlarged openings 13 is another sinuous passage-way 22 which communicates with another enlarged opening 23 in which there are mounted contact plates 24 and 25, similar to the contact plates 14 and 15, and which are also in electrical connection with the conductor bars 20 and 21 by means of their respective fastening screws 26 and 27.

To the rear from the contact plates 24 and 25 is a chamber 28, the bottom of which is depressed as at 29, as shown in Figs. 2 and 3 of the drawings. The bottom of the well or chamber 7, at the forward end of the passageway, is also depressed, as at 30, below the bottom line of the passage-way, the depressions 29 and 30 being provided for the reception of a globule of mercury 31, which is adapted, when passing through the passage-way and chambers in the block 6, to make electrical connection between the plates 24 and 25, and the plates 14 and 15, and finally between the inner ends of the studs 10 and 11 of the binding posts 8 and 9.

The top of the block 6 is closed by means of a cover plate 32, which is held in place, to retain the globule of mercury, by means of screws 33 or other suitable fastening devices.

At the rear end of the block 6 there is secured a bracket device 34, which is secured thereto by means of a bolt 35, and which is provided with an upwardly extending ear 36 having a central aperture 37 to enable the device to be adjustably secured to the brake pedal arm by suitable attaching devices. For example, in Fig. 1 of the drawings, the device is shown as mounted in connection with the brake pedal lever of an automobile of the Ford type. As there shown the brake pedal lever 38 is mounted on a spindle 39 and is normally secured thereto by means of a bolt 40 which passes through the boss 41 of the brake pedal lever 38, as well as through the spindle 39. In the present instance, the bolt 40 is also utilized for securing to the boss 41 of the brake pedal lever 38, an attaching member or bracket 42 to which the ear 36 of the bracket 34, which is carried by the block 6, is adapted to be secured by means of a bolt 43, and a wing nut 44, the bolt 43 passing through the aperture 37 of the ear 36 of bracket 34, whereby the relative angular position of the block 6 with respect to the brake pedal lever 38 may be adjusted as required.

In Fig. 5 of the drawings there is shown a modified form of attaching device which is adaptable to brake pedal levers of other types of automobiles. In this instance the bracket 34, which is secured to the block 6, is secured by means of a bolt 45 and wing nut 46 to one end of a slotted member 47, which in turn is secured by means of a bolt 48 and wing nut 49 to another slotted member 50. The other end of the slotted member 50 is secured by means of a bolt 51 and wing nut 52, to an ordinary split clamping bracket 53, which is adapted to be attached to the brake pedal lever 54 there shown at any permissible location. The provision of the slotted members 47 and 50 permits a range of adjustment to suit almost any condition of the arrangement of the mechanism of automobiles that may be found in practice.

Referring now to Fig. 3 of the drawings, the binding post 9 is shown diagrammatically as being connected by wire 55 to a battery 56, which may be the ordinary storage battery of the electrical system of the automobile, the circuit then continuing by means of wire 57 to the "stop" or signal light or lamp 58 of any of the usual types, and the circuit thence continues by means of wire 59 to the other binding post 8.

The operation of the device may now be explained. The switch device is attached to the brake pedal lever as hereinbefore described, the block of insulating material being in the position shown in Fig. 1 of the drawings with the forward end thereof elevated from the horizontal, when the brake pedal lever is in the position assumed when the brakes of the motor vehicle are released. When the device is in the position aforesaid, the globule of mercury will rest within the depression 29 of the chamber 28, at the rear end of the structure. When, however, the brake pedal lever is actuated for the purpose of applying the brakes of the motor vehicle, the inclination of the block of insulating material will be changed so that the forward end thereof will be depressed below the horizontal. When the device is thus tilted the globule of mercury will be dislodged from the depression 29 in the chamber 28, the action being assisted by reason of the checking of the momentum of the motor vehicle, and the globule of mercury will then run forward, first passing across the lower portions of the contact plates 24 and 25, then continuing forward and passing through the sinuous passage-way 22 into the chamber 13, where the same will pass over the lower portions of the contact plates 14 and 15, thence continuing through the sinuous passageway 12, and finally stopping in the well or chamber 7 at the front end of the block 6. As the globule of mercury passes over the contact plates 24 and 25, and the contact plates 14 and 15, the circuit will, in each instance, be momentarily closed and the "stop" or signal light will be caused to flash, and finally, when the globule of mercury comes to rest in the well or chamber 7, the electrical connection will be established through the studs 10 and 11 of the binding posts 8 and 9, and the "stop" or signal lamp will remain lighted so long as the brake pedal lever is held in the forward position, and the block 6 consequently in the depressed position. By the provision of the sinuous passageways 22 and 12, a substantial time period will occur between the successive preliminary flashes of the lamp, prior to the final lighting of the same when the globule of mercury comes to rest in its forward position, and this without unduly increasing the length of the structure, which would render the same impractical for its intended purpose.

It will be seen that there is thus provided a simple and efficient device for establishing an electrical connection for the purpose of lighting a "stop" or signal lamp, whenever the brakes are actuated, which will be certain and positive in its action, which will not be likely to become disarranged or out of order through continued use, and in which provision is made for preliminary flashing of the light prior to the final lighting of the same, whereby drivers of vehicles in the rear will have their attention more positively attracted to the operation of the signal.

Having thus described the nature and characteristic features of my invention, what I claim as new and desire to secure by Letters Patent is:

1. A switch for automobile "stop" lights and the like comprising a block of insulating material having chambers at the forward and rear ends thereof and a passageway connecting said chambers, a pair of separated contact devices extending into the chamber at one end thereof and adapted to be electrically connected to a signal lamp circuit, a globule of mercury adapted to pass through said passageway and close the signal lamp circuit as said globule contacts with said pair of contact devices, said passageway having constricted sinuous portions between the chambers adapted to retard the passage of said globule of mercury, and a bracket for supporting said block adapted to be secured to a tiltable portion of the automobile brake mechanism.

2. A switch for automobile "stop" lights and the like comprising a block of insulating material having chambers at the forward and rear ends thereof and a passageway connecting said chambers, a pair of separated contact devices extending into the chamber at one end thereof and adapted to be electrically connected to a signal lamp circuit, a globule of mercury adapted to pass through said passageway and close the signal lamp circuit as said globule contacts with said pair of contact devices, said passageway having constricted sinuous portions between the chambers adapted to retard the passage of said globule of mercury, a bracket for supporting said block adapted to be secured to a tiltable portion of the automobile brake mechanism, and means for angularly adjusting the block with respect to said bracket.

3. A switch for automobile "stop" lights and the like comprising a block of insulating material having chambers at the forward and rear ends thereof and a passageway connecting said chambers, a pair of separated contact devices extending into the chamber at one end thereof and adapted to be electrically connected to a signal lamp circuit, a plurality of pairs of separated contact devices arranged at intervals in said passageway, said contact members also being adapted to be electrically connected to the signal lamp circuit, a globule of mercury adapted to pass through said passageway and close the signal lamp circuit as said globule contacts with respective pairs of contact devices, said passageway being so shaped and constricted between the contact devices as to retard the passage of said globule of mercury, and a bracket for supporting said block adapted to be secured to a tiltable portion of the automobile brake mechanism.

4. A switch for automobile "stop" lights and the like comprising a block of insulating material having chambers at the forward and rear ends thereof and a passageway connecting said chambers, a pair of separated contact devices extending into the chamber at one end thereof and adapted to be electrically connected to a signal lamp circuit, a plurality of pairs of separated contact devices arranged at intervals in said passageway, said contact members also being adapted to be electrically connected to the signal lamp circuit, a globule of mercury adapted to pass through said passageway and close the signal lamp circuit as said globule contacts with respective pairs of contact devices, said passageway having constricted sinuous portions between the contact devices adapted to retard the passage of said globule of mercury, and a bracket for supporting said block adapted to be secured to a tiltable portion of the automobile brake mechanism.

5. A switch for automobile "stop" lights and the like comprising a block of insulating material having chambers at the forward and rear ends thereof and a passageway connecting said chambers, a pair of separated contact devices extending into the chamber at one end thereof and adapted to be electrically connected to a signal lamp circuit, a plurality of pairs of separated contact devices arranged at intervals in said passageway, said contact members also being adapted to be electrically connected to the signal lamp circuit, a globule of mercury adapted to pass through said passageway and close the signal lamp circuit as said globule contacts with respective pairs of contact devices, said passageway having constricted sinuous portions between the contact devices adapted to retard the passage of said globule of mercury, a bracket for supporting said block adapted to be secured to a tiltable portion of the automobile brake mechanism, and means for angularly adjusting the block with respect to said bracket.

In testimony whereof, I have hereunto signed my name.

BENJAMIN V. OGDEN.